(12) United States Patent
Fu

(10) Patent No.: US 8,442,348 B2
(45) Date of Patent: May 14, 2013

(54) IMAGE NOISE REDUCTION FOR DIGITAL IMAGES USING GAUSSIAN BLURRING

(75) Inventor: Guoyi Fu, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1224 days.

(21) Appl. No.: 12/266,112

(22) Filed: Nov. 6, 2008

(65) Prior Publication Data

US 2010/0111439 A1    May 6, 2010

(51) Int. Cl.
*G06K 9/40* (2006.01)
*G06K 9/00* (2006.01)

(52) U.S. Cl.
USPC .......................................... 382/275; 382/137

(58) Field of Classification Search .................... 382/275
See application file for complete search history.

(56) References Cited

U.S. PATENT DOCUMENTS

| | | | |
|---|---|---|---|
| 5,321,768 A | 6/1994 | Fenrich et al. | |
| 5,392,365 A * | 2/1995 | Steinkirchner | 382/260 |
| 5,740,271 A * | 4/1998 | Kunkler et al. | 382/137 |
| 5,889,885 A | 3/1999 | Moed et al. | |
| 5,956,421 A | 9/1999 | Tanaka et al. | |
| 6,208,756 B1 | 3/2001 | Suzuki | |
| 7,006,705 B2 * | 2/2006 | Takayama et al. | 382/275 |
| 7,016,536 B1 | 3/2006 | Ling et al. | |
| 7,039,232 B2 | 5/2006 | Nagarajan et al. | |
| 7,079,687 B2 * | 7/2006 | Guleryuz | 382/180 |
| 7,110,607 B2 * | 9/2006 | Fujimoto et al. | 382/237 |
| 7,187,785 B2 * | 3/2007 | Ikeda et al. | 382/115 |
| 7,190,832 B2 * | 3/2007 | Frost et al. | 382/173 |
| 7,268,916 B2 | 9/2007 | Kokemohr et al. | |
| 7,295,233 B2 * | 11/2007 | Steinberg et al. | 348/241 |
| 7,426,291 B2 * | 9/2008 | Okamura | 382/137 |
| 7,433,535 B2 * | 10/2008 | Mukherjee | 382/266 |
| 2001/0022857 A1 * | 9/2001 | Kondo et al. | 382/268 |
| 2004/0240737 A1 * | 12/2004 | Lim et al. | 382/182 |
| 2005/0069217 A1 * | 3/2005 | Mukherjee | 382/266 |
| 2005/0117812 A1 | 6/2005 | Nishi et al. | |
| 2007/0009175 A1 * | 1/2007 | Lim et al. | 382/275 |

(Continued)

FOREIGN PATENT DOCUMENTS

| | | |
|---|---|---|
| JP | 11091988 | 4/1999 |
| JP | 2001-160903 | 6/2001 |
| JP | 2004272813 | 9/2004 |
| JP | 2005196282 | 7/2005 |

OTHER PUBLICATIONS

Yuan et al., Text Extraction from Gray Scale Document Images Using Edge Information, Document Analsis and Recognition, 2001, pp. 302-306.*

(Continued)

*Primary Examiner* — David Zarka

(57) ABSTRACT

Disclosed are methods, devices, and computer program products for image noise reduction. In one example embodiment, a method for reducing noise in a digital image includes several acts. First, one or more objects are identified in an input image. Next, the input image or a portion thereof is processed to produce another image, which may be a blurred version of the input image. Finally, one or more objects in the processed image that correspond to the one or more objects identified in the input image are evaluated to determine whether to discard the one or more objects identified in the input image. For example, if an amount of energy preserved in an object after blurring is less than a threshold, the object may be discarded as noise.

18 Claims, 4 Drawing Sheets

U.S. PATENT DOCUMENTS

2007/0290696 A1* 12/2007 Majima et al. ............. 324/750
2008/0187219 A1* 8/2008 Chen et al. ................ 382/173
2008/0267497 A1* 10/2008 Fan .......................... 382/173

OTHER PUBLICATIONS

Yi et al., Detecting Text Lines in Handwritten Documents, the 18th International Conference on Pattern Recognition, IEEE, 2006, pp. 1-4.*

Strouthopoulus et al., Text Extract in Complex Color Documents, Pattern Recogntion 35, 2002, pp. 1743-1758.*

Fingerprint Image Enhancement Using Filtering Techniques, Shlomo Greenberg, Mayer Aladjem, Daniel Kogan, and Itshak Dimitrov, Electrical and Computer Engineering Department, Ben-Gurion University of the Negev, Beer-Sheva, Israel, Aug. 5, 2002, (pp. 1-4).

Image Segmentation Scheme Based on Region Growing for Gray Images, Young-Geun Yoon, Seok-Lyong Lee, Ho-Hyun Park and Chin-Wan Chung, Mar. 30, 2005, (pp. 1-12).

* cited by examiner

IMAGE NOISE REDUCTION FOR DIGITAL IMAGES USING GAUSSIAN BLURRING

THE FIELD OF THE INVENTION

Embodiments of the invention relate to digital image processing. More specifically, disclosed embodiments relate to methods, devices, and computer-readable media for reducing noise in digital images.

BACKGROUND

A digital image includes pixels with various levels of intensity. For example a gray-scale image includes pixels that are various shades of gray ranging from black to white. A digital image can be converted to a bitonal or binary image, in which pixels are either black or white, using a process known as thresholding. Thresholding can be useful in separating foreground features of an image, such as handwriting and printed text, from background features, such as background patterns or noise. As result, the text can be detected and/or made more readable for humans or optical character recognition (OCR) techniques. However, some thresholding techniques may not be effective at distinguishing foreground features from background features. In particular, foreground intensity levels in some check images may not differ significantly from background intensity levels due to noise or widely varying intensities in the background and/or foreground. Thus, some background features can remain as residual background noise after thresholding has been performed.

Reducing or removing residual background noise in a binary image without materially affecting the desirable elements of the image can be difficult. One type of binary image is a binary image of a check. A binary image of a check may include one or more text regions, such as a payee area, amount payable area(s), and/or signature area. Excessive noise in a binary image will negatively affect detection of text or other objects and/or legibility of the binary image.

SUMMARY OF EXAMPLE EMBODIMENTS

In general, example embodiments relate to methods, devices, and computer-readable media for reducing noise in a digital image.

In a first example embodiment, a method for reducing noise in an image includes several acts. First, one or more objects are identified in an input image. Next, the input image or a portion thereof is processed to produce another image, which may be a blurred version of the input image. Finally, one or more objects in the processed image that correspond to the one or more objects identified in the input image are evaluated to determine whether to discard the one or more objects identified in the input image. For example, if an amount of energy preserved in an object after blurring is less than a threshold, the object may be discarded as noise.

In a second example embodiment, a method for reducing noise in an image includes several acts. First, a set of pixels in a binary image are identified as defining an object. Next, at least a portion of the binary image including the set of object pixels is blurred. Finally, the identified object is discarded from the binary image if an amount of energy preserved in the set of blurred object pixels exceeds a threshold.

In a third example embodiment, one or more computer-readable media have computer-readable instructions thereon which, when executed, implement the method for reducing noise in an image discussed above in connection with the first example embodiment.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION

Figure 1:
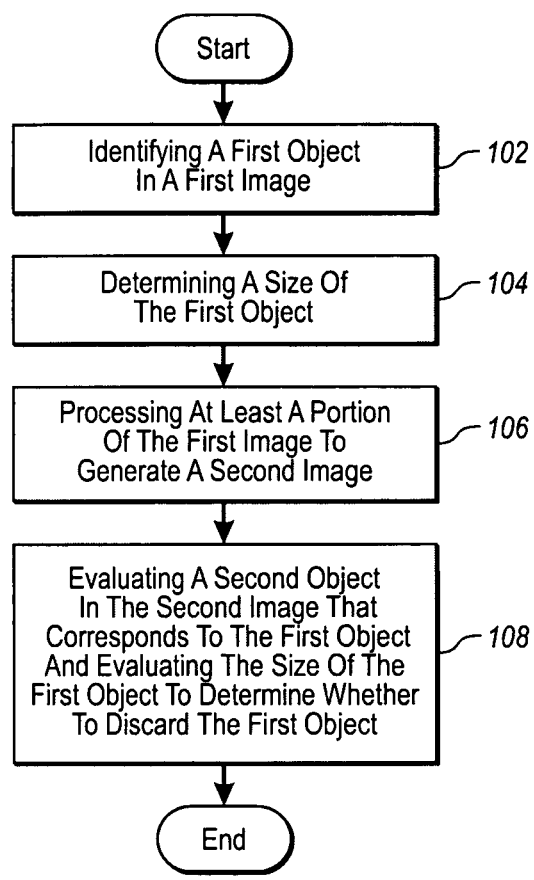
FIG. 1 discloses an example method for processing an image to reduce noise.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for reducing noise in images. Example embodiments can be used to produce images of a check (or portions thereof) in which foreground features of a check, such as handwriting and/or printed text, are preserved and background features of a check, such as background patterns and/or noise, are discarded. Consequently, image quality may be enhanced and the foreground features can be more easily detected and/or made more readable for humans or OCR techniques, among other things. Although images of checks are used for explanatory purposes below, one of ordinary skill in the art would appreciate that the example embodiments are not restricted to accepting check images only. Using the example embodiments to reduce noise in other types of images, containing or not containing text, is also contemplated.

Example embodiments reduce noise in images by, among other things, identifying a group of connected components or pixels as an object and determining whether a predetermined amount of energy is preserved in the object after a blurring filter is applied to the object. The amount of preserved energy is a useful indicator of whether the object has characteristics associated with foreground features such as text. For example, as compared to noise objects, a text object tends to have a higher degree of object solidity, a higher concurrency of high energy (e.g., black) pixels in and/or around the text, a smoother or more regular border, and a larger size, among other things. Example embodiments take into account, explicitly and/or implicitly, one or more of these features to determine whether an object should be preserved or discarded.

With reference now to FIG. 1, an example method 100 for reducing noise in an image is disclosed. More particularly, the example method 100 identifies objects in the image and determines whether the objects are background features, such as noise, or foreground features, such as text, and discards the noise-like objects to produce a reduced-noise image.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, check scanners (example of which include, but are not limited to, the Epson CaptureOne™ Check Scanner and the Epson TM-S1000 manufactured by Seiko Epson Corporation), copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/check scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a noise reduction capability, for example, to automatically reduce noise and/or detect text in an image. For example, a check scanner with this automatic noise reduction capability may include one or more computer-readable media that implement the example method 100, or a computer connected to the check scanner may include one or more computer-readable media that implement the example method 100.

Figure 2:
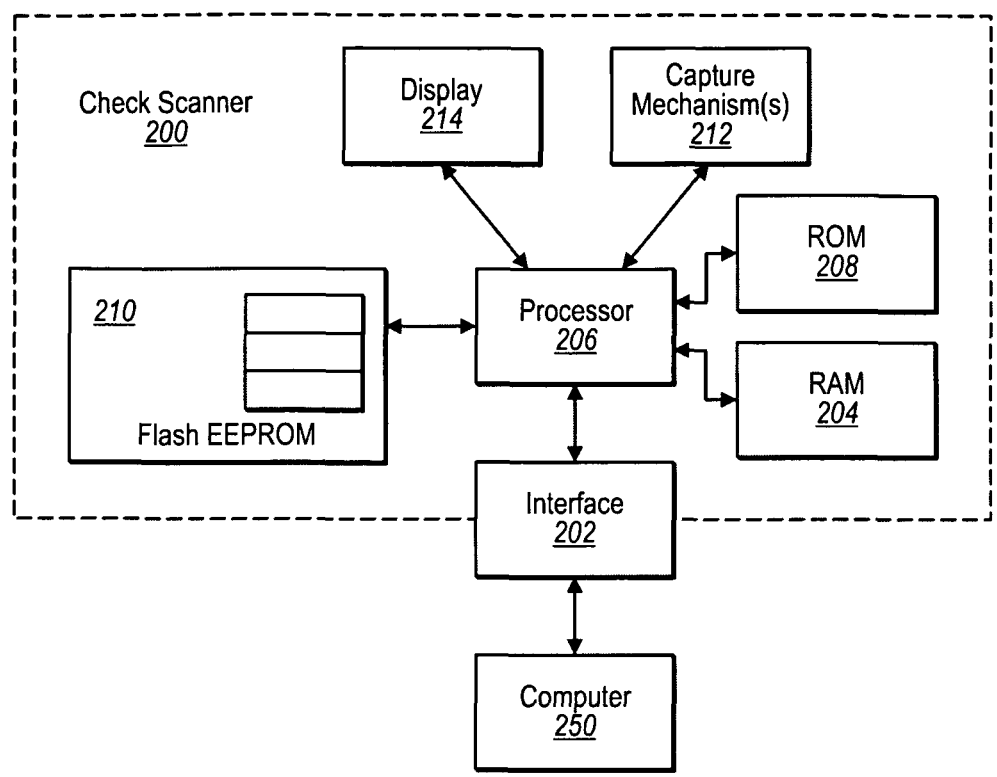
FIG. 2 is a schematic representation of an example check scanner.

A schematic representation of an example check scanner 200 is disclosed in FIG. 2. The example check scanner 200 exchanges data with a host computer 250 by way of an intervening interface 202. Application programs and a check scanner driver may also be stored for access on the host computer 250. When an image retrieve command is received from the application program, for example, the scanner driver controls conversion of the command data to a format suitable for the check scanner 200 and sends the converted command data to the check scanner 200. The driver also receives and interprets various signals and data from the check scanner 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the check scanner 200 from the capture mechanism(s) 212. For example, the capture mechanism(s) 212 can generate a digital photographic image of a paper check. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a binary digital image, for example, the processor 206 can implement the methodological acts of the method 100 on the binary digital image to automatically reduce noise in the binary digital image and consequently make text more readable and/or detectable. Further processing in an imaging pipeline may then be performed on the noise-reduced binary digital image before the image is displayed by the check scanner 200 on a display 214, such as an LCD display for example, or transferred to the host computer 250, for example.

It is understood that digital images may be received by the check scanner 200 from sources other than the computer 250 and the capture mechanism(s) 212, including, but not limited to, the flash EEPROM 210 or the ROM 208. Example embodiments of the check scanner 200 include, but are not limited to, the Epson CaptureOne™ Check Scanner or the Epson TM-S1000, TM-J9000, TM-J9100, TM-J7000, TM-J7100, or TM-H6000III, all manufactured by Seiko Epson Corporation.

The example method 100 for reducing noise in an image will now be discussed in connection with FIG. 1. Prior to performing method 100, a digital image can be targeted for various image processing operations including noise reduction. The targeted digital image may be a color or gray-scale digital image. Various image processing techniques may be applied to the targeted digital image before method 100 is performed. For example, the targeted digital image may undergo thresholding, resizing, sharpening, lightening, cropping, etc. In one example embodiment, the targeted digital image is a gray-scale image that undergoes thresholding to produce a binary image made up of black and white pixels. The gray-scale image may also be filtered with a ridge-enhancing filter to distinguish foreground features from background features. The resulting binary and/or ridge-enhanced image may be provided as an input image to method 100.

In addition, the targeted digital image may be cropped to include one or more text regions in which text is expected to appear. For example, an image of a check may include the following text regions: a payor information region, a payee name region, one or more amount payable regions, and a signature region. An input image to method 100 may include a single text region. Alternatively, the input image may include a plurality of text regions or a plurality of text regions are in close proximity. Method 100 may be applied in sequence to each of a plurality of cropped out text regions.

At 102, an act of identifying a first object in a first image is performed. The act 102 can be performed, for example, by first accessing an input image. The input image can be a binary digital image having one or more objects (e.g., text or noise objects). Identifying an object may include identifying connected components, which are regions of pixels that share the same or similar pixel intensity or energy values. In a binary image, for example, an object may be defined by a set of pixels in close proximity that all have an intensity value of 1 (e.g., all black). In a gray-scale image, on the other hand, an object may include pixels in close proximity that have intensity values falling within a predetermined range or bin.

An n-neighborhood connectivity technique may be used to identify connected components or objects. That is, if a first pixel's intensity value identifies it as being part of a first object (e.g., if a first pixel is black), intensity values of the first pixel's n nearest neighbors are evaluated to determine whether the neighboring pixels should also be identified as part of the first object. Thus, if a second pixel in proximity to the first pixel corresponds to the intensity value of the first pixel (e.g., if both pixels are black), the second pixel is identified as being part of the first object. An eight-neighborhood connectivity technique may be used in which the eight pixels immediately adjacent to the first pixel are evaluated. Depending on an expected text quality and availability of processing resources, among other things, smaller or larger neighborhood connectivity techniques may be used for object identification.

At 104, a size of the first object may then be determined. Various estimations or measurements of size may be used. An area of a minimum bounding box (i.e., the smallest rectangular box in which the object fits) is one example of a size that can be determined within minimal calculation.

Next, at 106, an act of processing at least a portion of the first image is performed to generate a second image. Processing at least a portion of the image may include, for example, ridge-enhancing, blurring, and/or smoothing the first image or portion thereof. Many ridge-enhancing, blurring, and smoothing techniques exist. A Gaussian filter such as the following, for example, may be used to perform blurring on an image having a resolution of 200 dots per inch:

$$h = \begin{bmatrix} 0.0113 & 0.0838 & 0.0113 \\ 0.0838 & 0.6193 & 0.0838 \\ 0.0113 & 0.0838 & 0.0113 \end{bmatrix}$$

Alternatively, a two dimensional Gaussian filter may be implemented by applying two one-dimensional (horizontal and vertical) filters. In addition, the filter's size may be adaptive so as to depend on image resolution and be adjusted accordingly.

At 108, an act of evaluating a second object in the second image that corresponds to the first object and an act of evaluating the size of the first object may be performed. One or both of these evaluation acts may be performed to determine whether to discard the first object from the first image. To evaluate the second object, an energy preserve ratio may be calculated. Because the second object pixels have been processed by, for example, a blurring filter, the energy preserve ratio represents an amount of energy preserved in the second object after blurring of the first object.

The energy preserve ratio may be calculated by first identifying the second object in the second image. The second object includes pixels in the second image that correspond to the pixels of the first object in the first image. For example, where the second image is the same size as the first image, the second object pixels may have the same image coordinates as each of the first object pixels. The energy in each of the first and second objects may then be calculated. The intensity values of a pixel correspond to its energy. Thus, the intensity values of the first object's pixels may be summed to form a first sum indicating an amount of energy in the first object. Similarly, the intensity values of the second object's pixels may be summed to form a second sum indicating an amount of energy in the second object. The energy preservation ratio may be determined by calculating a ratio of the second sum to the first sum or vice-versa.

In order to determine whether to discard the first object from the first image, the energy preservation ratio may be compared to a threshold. For example, if the energy preservation ratio exceeds the threshold the first object is likely to be a text object and therefore is preserved. If, however, the energy preservation ratio does not exceed the threshold a decision may be made to discard the first object as noise.

The threshold on which the discarding decision is based may be a predetermined constant, in which case the act of evaluating the size of the first object at 108 may be omitted. Alternatively, the threshold may be an adaptive or variable threshold that varies based on criteria such as the size of the first object. Varying the threshold based on object size may help distinguish noise objects from text objects where the noise objects are expected to be smaller on average than the text objects. As discussed above, the size of the first object may be determined based on an area of the first object's minimum bounding box. The adaptive threshold may be implemented in a variety of ways. For example, one function that may be used as the adaptive threshold is $1 - k * \log_{10}(Area)$ where Area is the area of the first object. The parameter k may be a predetermined value set to 0.065 in one example embodiment. Alternatively, the parameter k may be set to another predetermined value based on a desired threshold sensitivity or may be dynamically adaptive or manually adjustable based on criteria including, for example, the degree of blurring applied at 106 and/or the input image's resolution. Moreover, the adaptive threshold may depend on a logarithmic function of the area to make the threshold adaptable to a wide range of object sizes and image resolutions.

Upon completion of the evaluation act at 108, one or more of the acts shown in method 100 may be repeated to identify additional objects and determine whether to discard them as noise. Thus, after one or more iterations of acts 102-108 an output image may be produced in which noise is reduced.

In addition to the various alternatives described above, various other versions of method 100 may be implemented including versions in which various acts are omitted or added or in which the order of the depicted acts differ. In one embodiment, for example, one or more of the acts performed at 102 and 104 may be iterated before proceeding to subsequent acts.

For example, the act of identifying a first object in the first image at 102 may be iterated to find all objects in the first image before proceeding to subsequent acts at 104-108. Identifying the objects may include labeling each pixel with an object label to produce an object map having the same size as the first image. Alternatively, the act of identifying a first object in the first image at 102 and the act of determining the object's size at 104 may be iterated to find and label a plurality of objects in the first image and determine their sizes before proceeding to subsequent acts at 106 and 108. In embodiments where the acts performed at 102 (and, optionally, 104) are iterated to find a plurality of objects, one or both of the subsequent acts 106 and 108 may then be iterated to sequentially evaluate and preserve/discard each object identified by the iteration of act 102.

In another embodiment, which may be combined with any one of the previous embodiments heretofore described, the act performed at 106 (i.e., processing at least a portion of the first image to generate a second image) may include processing (e.g., blurring) only a region of the first image that corresponds to the first object's minimum bounding box or a slightly larger region that encompasses the minimum bounding box. In doing so, a processing time may be reduced as compared to processing the entire first image to generate the second image. With processing regions restricted in this manner, the acts performed at 102-106 may be iterated with respect to each object identified in the first image before proceeding to evaluate corresponding objects in the second image.

Alternatively, the processing act performed at 106 may include processing (e.g., blurring) the entire first image and therefore omitting the act of processing in any subsequent iterations of the acts in method 100. Moreover, because processing the entire first image does not depend on identification of any particular object, processing the entire image may be performed prior to or after the act performed at 102 or, as shown in FIG. 1, after the act performed at 104.

In another embodiment, which may be combined with any one of the previous embodiments heretofore described, the act of determining the first object's size at 104 may be omitted. Accordingly, the evaluation act at 108 may be altered to omit evaluation of the first object's size. Thus, the threshold against which the energy preservation ratio is compared may be a predetermined constant or may be an adaptive threshold that depends on a variable other than object size.

In another embodiment, which may be combined with any one of the previous embodiments heretofore described, the act of evaluating the second object in the second image performed at 108 may include comparing an amount of energy in the second object to a threshold that is based on an amount of energy in the first object. Thus, instead of using the energy preservation ratio to account for the energy in the first object, as described above, the threshold may be used to account for the energy in the first object.

Figure 3A:
FIG. 3A is a binary image of a first example handwriting area of a check.
Figure 3B:
FIG. 3B is a binary image of the first example handwriting area of FIG. 3A in which noise has been reduced using the example method of FIG. 1.
Figure 4A:
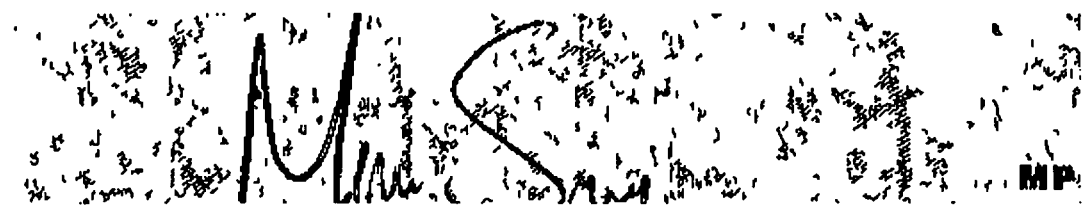
FIG. 4A is a binary image of a second example handwriting area of a check.
Figure 4B:
FIG. 4B is a binary image of the second example handwriting area of FIG. 4A in which noise has been reduced using the example method of FIG. 1.

The example method 100 for reducing noise in an image can be used to detect the presence of and/or read foreground features such as handwriting and text in images of checks. FIG. 3A is a binary image of an amount payable region of an example check. FIG. 3B is a binary image of the amount payable region of FIG. 3A in which noise has been reduced using the example method 100 of FIG. 1. As disclosed in FIG. 3B, performing method 100 on the image of FIG. 3A eliminates noise such as background features of the example check. FIGS. 4A and 4B provide a similar example with respect to a signature region of an example check.

In addition to making foreground features more readable for humans or OCR techniques, noise reduction may also improve various other processes. For example, noise reduction may improve the reliability of a signature authentication process in which a detected handwritten signature is compared to a previously stored handwritten signature. Another application of noise reduction may be to improve detection of when a text region, such as the signature or amount payable region, is not filled out and flag the check as problematic. Moreover, although methods, devices, and computer program products have been described herein with reference to detecting text in check images, the methods, devices, and computer program products may also be applicable to other types of images in which text or features other than text are detected.

The example embodiments disclosed herein may be embodied in other specific forms. The example embodiments disclosed herein are to be considered in all respects only as illustrative and not restrictive.

What is claimed is:

1. A method of reducing noise in an input image, the method comprising the act of using a processor to:
   wherein said input image has a plurality of first objects, applying the following steps to individual first objects within said plurality of first objects:
   (i) process the first object to generate a corresponding second object of differing energy as the first object;
   (ii) determine an energy preservation ratio indicating the amount of energy of the first object preserved in it corresponding second object; and
   (iii) determining whether to retain or remove the first object from said input image in response to a comparison of the energy preservation ratio with a threshold;
   wherein said second object is generated to have a lower energy than said first object;
   the energy preservation ratio is defined as a ratio of the energy of the second object to the energy of its corresponding first object; and the first object is retained in response to the energy preservation ratio being greater than the threshold, and is removed otherwise; and
   wherein the threshold is an adaptive threshold dynamically adapted based on characteristics of at least one of the first and second objects from which the energy preservation ratio to which it is compared is defined.

2. The method of claim 1, wherein said second object is generated to have a lower energy than said first object.

3. The method of claim 2, wherein said second object is generated by applying a blurring process to said first object.

4. The method of claim 3, wherein said blurring process is a Gaussian blur process.

5. The method of claim 1, wherein the energy preservation ratio is defined as a ratio of the amount of energy of the first object to the amount of energy of its corresponding second object.

6. The method of claim 1, wherein the adaptive threshold is inversely proportional to the size of the first object.

7. The method of claim 1, wherein said second object is generated by applying a blurring process to its corresponding first object, and the adaptive threshold is adapted based on the degree of blurring applying to the first object.

8. The method of claim 1, wherein the adaptive threshold is dependent on a logarithmic function of the area of the first object.

9. The method of claim 1, wherein the adaptive threshold is dependent upon the resolution of the first object.

10. The method of claim 1, wherein the adaptive threshold is dependent upon the size of the first object's minimum bounding box.

11. The method of claim 1, wherein the adaptive threshold is dependent upon the amount of energy in the first object.

12. The method of claim 1, wherein each of said first objects is identified as a separate connected-component object within said input image.

13. The method of claim 12, wherein only the portions of the input image defined by said plurality of first objects are processed by said steps (i), (ii), and (iii).

14. The method of claim 1, wherein the second object is of the same size and has the same coordinates as it corresponding first object.

15. The method of claim 1, wherein said steps are separately applied to each of said first objects within said plurality of first objects.

16. The method of claim 1, wherein the first object is a binary image-object and its corresponding second object is a gray-scale image-object.

17. A non-transitory computer readable medium comprising computer-executable instructions for implementing a method of reducing noise in an input image, the method comprising:
   wherein said input image has a plurality of first objects, applying the following steps to individual first objects within said plurality of first objects:
   (i) process the first object to generate a corresponding second object of differing energy as the first object;
   (ii) determine an energy preservation ratio indicating the amount of energy of the first object preserved in it[s] corresponding second object; and
   (iii) determining whether to retain or remove the first object from said input image in response to a comparison of the energy preservation ratio with a threshold:
   wherein said second object is generated to have a lower energy than said first object;
   the energy preservation ratio is defined as a ratio of the energy of the second object to the energy of its corresponding first object; and the first object is retained in response to the energy preservation ratio being greater than the threshold, and is removed otherwise; and
   wherein the threshold is an adaptive threshold dynamically adapted based on characteristics of at least one of the first and second objects from which the energy preservation ratio to which it is compared is defined.

18. A computing device for reducing noise in an input image, comprising:
   an input for receiving said input image; and
   a processor implementing the following step:
   wherein said input image has a plurality of first objects, for individual first objects within said plurality of first objects:
   (i) process the first object to generate a corresponding second object of differing energy as the first object;
   (ii) determine an energy preservation ratio indicating the amount of energy of the first object preserved in it[s] corresponding second object; and
   (iii) determining whether to retain or remove the first object from said input image in response to a comparison of the energy preservation ratio with a threshold:,
   wherein said second object is generated to have a lower energy than said first object;
   the energy preservation ratio is defined as a ratio of the energy of the second object to the energy of its corresponding first object; and the first object is retained in response to the energy preservation ratio being greater than the threshold, and is removed otherwise; and
   wherein the threshold is an adaptive threshold dynamically adapted based on characteristics of at least one of the first and second objects from which the energy preservation ratio to which it is compared is defined.

* * * * *